United States Patent
Wright

(10) Patent No.: US 10,023,169 B2
(45) Date of Patent: Jul. 17, 2018

(54) SLEEP MODE FOR AN AIR DRYER

(71) Applicant: NEW YORK AIR BRAKE, LLC, Watertown, NY (US)

(72) Inventor: Eric C. Wright, Evans Mills, NY (US)

(73) Assignee: NEW YORK AIR BRAKE, LLC, Watertown (*) Notice: Subject to any disclaimer, the term of this patent is extended or adjusted under 35 U.S.C. 154(b) by 241 days.

(21) Appl. No.: 14/865,700

(22) Filed: Sep. 25, 2015

(65) Prior Publication Data

US 2017/0088110 A1 Mar. 30, 2017

(51) Int. Cl.
*B01D 53/02* (2006.01)
*B60T 17/00* (2006.01)
*B01D 53/26* (2006.01)

(52) U.S. Cl.
CPC .......... *B60T 17/004* (2013.01); *B01D 53/261* (2013.01); *B01D 2259/402* (2013.01); *B01D 2259/40003* (2013.01); *B01D 2259/40086* (2013.01); *B01D 2259/4566* (2013.01)

(58) Field of Classification Search
CPC .......... B01D 2259/40003; B01D 2259/40086; B01D 2259/402; B01D 2259/4566; B01D 53/261; B60T 17/004
See application file for complete search history.

(56) References Cited

U.S. PATENT DOCUMENTS

| | | | | |
|---|---|---|---|---|
| 4,685,941 A * | 8/1987 | Sato | ..................... | B01D 53/261 96/114 |
| 4,936,026 A * | 6/1990 | Cramer | ................. | B60T 17/004 34/562 |
| 5,066,317 A * | 11/1991 | Gross | ................... | B01D 53/261 55/303 |
| 8,078,377 B2 * | 12/2011 | Diekmeyer | ........... | B60T 17/004 303/9.66 |
| 2004/0242144 A1 * | 12/2004 | Burn | ..................... | B01D 53/26 454/156 |
| 2010/0089239 A1 * | 4/2010 | Wright | ................... | B01D 53/22 96/6 |
| 2012/0000549 A1 * | 1/2012 | Thorne | ................. | A61M 16/01 137/455 |
| 2012/0153711 A1 * | 6/2012 | Minato | ................. | B60T 13/662 303/10 |
| 2015/0218987 A1 * | 8/2015 | Minato | .............. | B01D 53/0407 96/113 |
| 2015/0336047 A1 * | 11/2015 | Billiet | ..................... | B01J 20/18 95/91 |

* cited by examiner

*Primary Examiner* — Christopher P Jones
(74) *Attorney, Agent, or Firm* — Bond Schoeneck & King, PLLC; David Nocilly

(57) ABSTRACT

An air dryer for a locomotive air supply system that includes a controller programmed to initiate a sleep mode that inhibits the air dryer and de-energizes all valves. The controller determines when it is appropriate to enter into sleep mode based on various conditions of the locomotive air supply system. More specifically, the controller is programmed to calculate whether the air dryer should be placed into sleep mode based on operational characteristics of the locomotive air supply system that are indicative that the system has been idled. The initiation of an air dryer sleep mode by the controller prevents undesirable venting of air from the air supply system and unnecessary usage of locomotive battery power.

15 Claims, 4 Drawing Sheets

SLEEP MODE FOR AN AIR DRYER

BACKGROUND OF THE INVENTION

1. Field of the Invention

The present invention relates to railway air system air dryers and, more particularly, to an air dryer control system having a sleep mode to prevent the depletion of air and power during idling times.

2. Description of the Related Art

A typical "twin-tower" desiccant-type air dryer includes two drying circuits that are controlled by valves. Wet inlet air flows through one circuit to remove water vapor, while dry product air counter flows through the other circuit to remove the accumulated water and regenerate the desiccant. Inlet and outlet valves for each pneumatic circuit are responsive to controlling electronics to switch the air flow between the two circuits so that one circuit is always drying while the other is regenerating. The air dryer may include a pre-filtration stage with a water separator and/or coalescer positioned upstream of the drying circuits. The pre-filtration stage removes liquid phase and aerosol water and oil that can accumulate in air supply system as a result of the compression of ambient air by the locomotive air compressors. A pre-filtration stage includes a drain valve that is used to periodically purge any accumulated liquid. For example, a typical pre-filtration drain valve actuation cycle might command a purge (open) for two seconds every two minutes.

When a locomotive is parked, the driver will usually open the main circuit breaker and shut down the auxiliary electrically powered equipment, which includes the air dryer. Under certain circumstances, however, the locomotive may be parked or idled for an extended period with the electrical power left on. If the diesel engine or air compressor is turned off, the pre-filtration drain valve and desiccant regeneration valves will continue to cycle and will eventually deplete the main air reservoir and/or the locomotive battery. Some air supply systems address the problem of electrical power depletion by only operating the air dryer valves when the air compressor is running. This solution, however, does not fully address the problem, as it can result in inefficient drying of the air when it is operating. For example, air can still flow through an air dryer when the compressor is off. In addition, there are many instances when the compressor is turned on but no air is actually flowing through the air dryer such that operation of the valves is wasteful. Finally, in a multiple locomotive consist where all of the locomotives are coupled together by a main reservoir trainline, the other locomotives in the consist can be supplying compressed air to the locomotive whose compressor is off. Accordingly, there is a need in the art for an air dryer control system prevents the air dryer from unnecessarily venting compressed air or wasting electricity when the locomotive air supply system is intended to be idle.

BRIEF SUMMARY OF THE INVENTION

The present invention comprises an air dryer for a locomotive air supply system having a set of valves for controlling the flow of air from an inlet through one of two dessicant towers to an outlet and a controller for piloting the set of valves. More specifically, the controller is programmed to inhibit operation of the valves in response to a determination that the locomotive air supply system is not in use. The locomotive air supply system is determined to not be in use if the air compressor supplying air to the air dryer is not in operation for a predetermined period of time, if the electrical state of a diesel locomotive coupled to the air dryer indicates a lack of usage, if there is a lack of air flow through the air dryer over a predetermined period of time, if first main reservoir lacks sufficient pressure for a predetermined period of time, if the second main reservoir has a sufficient amount of pressure in the second main reservoir relative to the first main reservoir, or if the humidity in the air exiting the air dryer over a predetermined period of time indicates a lack of use of the air supply system. Accordingly, the air dryer may include a humidity sensor coupled to the controller, and the controller may be interconnected to the air compressor, the locomotive electrical system, pressure sensors in the first and second main reservoirs. The controller may also be interconnected to a check valve positioned between the first and second main reservoirs and, optionally, a flow meter positioned to measure air flow volume in the inlet to the air dryer.

The method of the present invention comprises a sleep mode control for an air dryer having a series of valves for controlling the flow of air from an inlet through at least one dessicant tower to an outlet and a controller for piloting the set of valves. The controller of the air dryer determines whether the locomotive air supply system is not in use and, if not, inhibits the series of valves during the time period the locomotive air supply system is not in use. The controller may restore normal operations periodically, or after detecting an indication that the locomotive air supply system is back in use.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
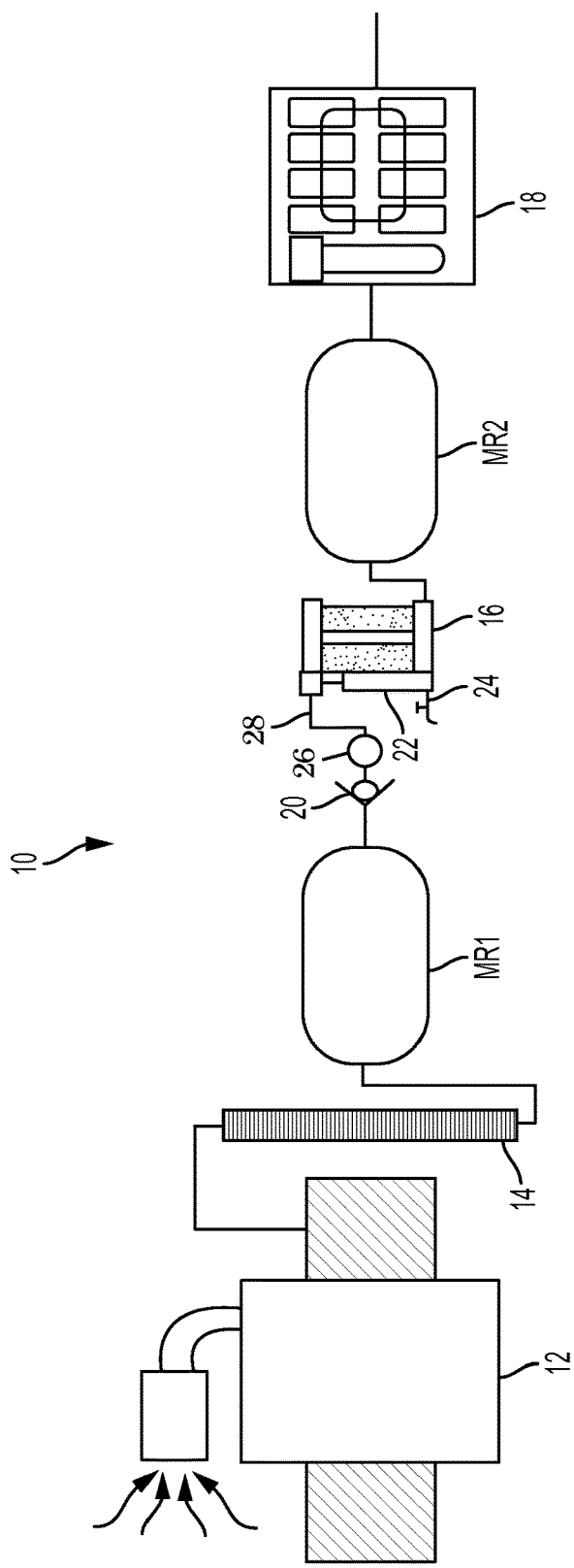
FIG. 1 is a schematic of a locomotive air supply system having an air dryer with sleep mode according to the present invention.

Referring now to the drawings, wherein like reference numerals refer to like parts throughout, there is seen in FIG. 1 a locomotive air system 10 having an air compressor 12, aftercooler 14, first and second main reservoirs MR1 and MR2, and a two-tower dessicant air dryer 16 having a sleep mode according to the present invention, as more fully described below. Second main reservoir MR2 is coupled to the braking system 18 and a check valve 20 is positioned between the first and second main reservoirs MR1 and MR2. A pre-filtration stage 22 is associated with air dryer 16 and includes a drain valve 24 that is operated according to a drain valve purge cycle time. Optionally, a flow meter 26 may be positioned in the inlet air to the air dryer.

Figure 2:
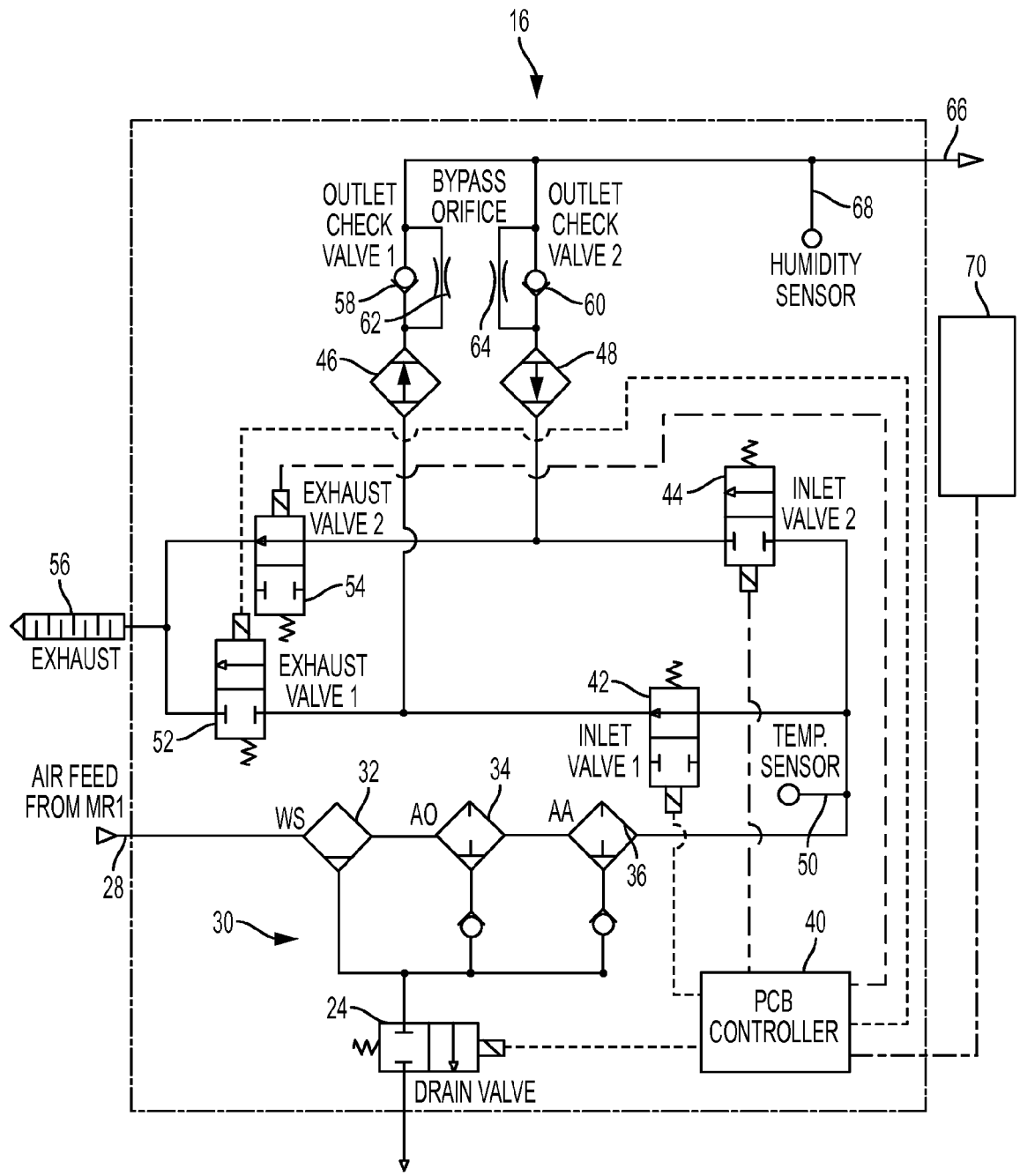
FIG. 2 is a schematic of an air dryer with a sleep mode according to the present invention.

Referring to FIG. 2, a two-tower dessicant air dryer 16 comprises an inlet 28 for receiving air from first main reservoir MR1. Inlet 28 is in communication with an integral pre-filtration stage 30, shown as including a water separator 32, a coarse coalescer 34, and a fine coalescer 36. Any accumulated liquids in water separator 32, coarse coalescer 34, and fine coalescer 36 are expelled through drain valve 24. A pair of inlet valves 42 and 44 are positioned downstream of pre-filtration stage 30 for diverting incoming air between one of two pathways, each of which is associated with one of two dessicant towers 46 and 48. A temperature sensor 50 is positioned upstream of inlet valves 42 and 44 and downstream of pre-filtration stage 30. The first pathway downstream of first inlet valve 42 leads to an exhaust valve 52 and first dessicant tower 46. The second pathway downstream of second inlet valve 44 leads to a second exhaust valve 54 and second dessicant tower 48. The first pathway further includes a first check valve 58 and first bypass orifice 62 downstream of first dessicant tower 46, and the second pathway further includes a second check valve 60 and bypass orifice 64 downstream of second dessicant tower 48. A single outlet 66 is coupled to the end of the first and second pathways, and a humidity sensor 68 is positioned upstream of outlet 66. Inlet valves 42 and 44 and outlet valves 52 and 54 are piloted by controller 40. Controller 40 operates inlet valves 42 and 44 and outlet valves 52 and 54 so that compressed air provided at inlet 28 is directed through one of dessicant towers 46 or 48 for drying. The other dessicant towers 46 or 28 may be regenerated by allowing dried air to reflow through bypass orifice 62 or 64 by opening the corresponding exhaust valve 52 or 54 for a given period of time. Controller 40 is also in communication with temperature sensor 50 and humidity sensor 68. A heating element 70 may also be coupled to controller 40 and positioned in air dryer 16 to warm inlet valves 42 and 44 and outlet valves 52 and 54 is the temperature is below freezing.

In addition to executing the normal operation of inlet valves 42 and 44 and outlet valves 52 and 54, controller 40 is programmed to determine whether the operation of air dryer 16 should be inhibited, such as when the locomotive is idle of if there is no demand for drying because air is not flowing through air dryer 16. When controller 40 determines the locomotive air system 10 is not in use, controller 40 is programmed to activate a sleep mode where actuation of drain valve 38 and/or inlet valves 42 and 44 and outlet valves 52 and 54 are suspended until controller 40 receives a signal indicating that air system 10 is in use again. When controller 40 determines that air system 10 is again in use, controller 40 may resume normal actuation of the valves. Once sleep mode is initiated, controller can de-energize the normally closed drain valve 24, the normally open inlet valves 42 and 44 and the normally closed outlet valves 52 and 54 to avoid undesirable leakage of air from air supply system 10.

Figure 3:
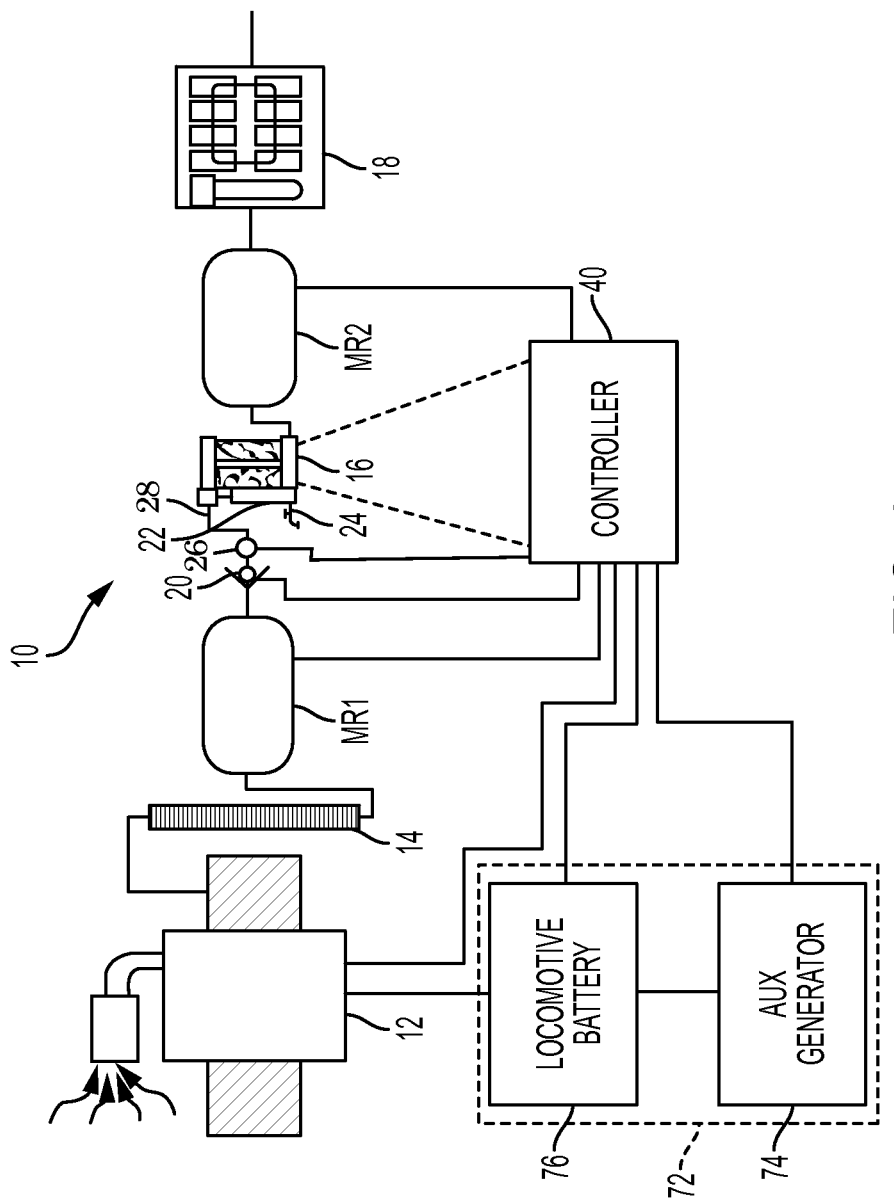
FIG. 3 is a schematic of an air dryer with a sleep mode according to the present invention interconnected to various elements of a locomotive air supply system.

Referring to FIG. 3, controller 40 may be interconnected to compressor 12 to receive an input reflecting when compressor 12 is being operated. For example, controller 40 may receive a signal reflecting the status of the compressor motor driver current, the unloader, or the motor control contactors. Similarly, controller 40 may be interconnected to the locomotive electrical system 72 to determine the status of the locomotive. For example, controller 40 may be interconnected to the output of the auxiliary generator 74 to determine whether the diesel locomotive is off. Controller 40 may also be interconnected to the locomotive battery 76 to determine whether the battery voltage has dropped below a predetermined threshold, thereby indicating that the diesel engine of the locomotive is not running and battery 76 is not being recharged. Any or all of these detected events may be used as a trigger for controller 40 to initiate sleep mode. Controller 40 may implement sleep mode for a predetermined period of time, or until controller 40 detects an event indicative of the resumption of use of the locomotive air supply system 10.

Instead of, or in addition to, detecting locomotive status events, controller 40 may also be programmed to determine whether there is any air flow through air dryer 16, or even the quality and amount of air flow through air dryer 16, as a trigger for entering sleep mode. For example, a binary reading may be taken from check valve 20 to provide an indication whether check valve 20 is open or closed, thereby allowing controller 40 to determine whether air is flowing from MR1 to MR2. Similarly, a proportional reading may be taken from check valve 20 to determine how far check valve 20 has opened. The size of the opening of check valve 20 is proportional to the pressure difference across check valve 20 and the spring rate and preload of the bias spring in check valve 20 are known. As a result, the amount of displacement of check valve 20 can be used to calculate the instantaneous flow rate across check valve 20. The total air flow volume can then be calculated by a simple integration of the instantaneous air flow rate over a given period of time. Lastly, the system may include flow meter 26 to directly measure the flow rate. Controller 40 may then be programmed to enter into sleep mode to inhibit valve actuation if there is zero air flow or if the air flow is below a predetermined threshold over a particular time period, such as twenty-four hours.

Controller 40 may also be interconnected to MR1 or MR2 to determine the pressure in either or both of those reservoirs. Controller 40 may then initiate sleep mode if the pressure in MR1 is less than the low pressure governor set point used to trigger air compressor 12 to recharge system 10 as this would indicate that the locomotive is not in a state where air compressor 12 needs to replenish MR1. Similarly, controller 40 may be programmed to initiate sleep mode if the pressure in MR2 is greater than the pressure in MR1 for a predetermined number of hours, thereby indicating that MR1 is not being recharged. The pressure in MR1 or MR2 may be determined by a pressure transducer or pressure switch that is interconnected to controller 40.

Controller 40 may also be programmed to measure the output of air dryer 16 to determine whether the sleep mode should be initiated. For example, a lack of change in humidity at the output of air dryer 16 may be used to infer that air supply system 10 is not in active use. For example, if the humidity remains sufficiently dry within a predetermined tolerance while the air dryer purge cycle time is at a maximum duration setting and temperature at inlet 28 is warm enough that the humidity should otherwise be increasing if there was air flow through the air dryer, controller 40 may initiate sleep mode.

Controller 40 may also be programmed to determine whether the outlet humidity reflects the expected saturation level for air flowing through air dryer 16 and, if not, initiate sleep mode. If the compressed air in MR1 is assumed to be saturated due to the compression pressure, the current air temperature and corresponding water vapor saturation level may be used to calculate the volume of air that, over time, would saturate one of desiccant towers 46 or 48 in air dryer 16. For example, at the measured temperature, controller 40 might calculate that 500 cubic feet of air from MR1 would saturate the desiccant of air dryer 16. At a flow rate of 90 standard cubic feet per minute (SCFM) saturation should occur in as little as 5.5 minutes. If the humidity of outlet 66 does not reflect saturation after the expected time to saturation has passed, controller can initiate sleep mode.

Instead of measuring the expected saturation time, controller 40 may instead by programmed to initiate sleep mode if the default regeneration cycle time has been reached a predetermined number of times without an increase in humidity. For any air dryer 16 having a variable regeneration cycle, controller 40 may be programmed to initiate sleep mode if the variable regeneration cycle has been extended a predetermined number of times without any resulting increase in humidity in the air passing through air dryer 16. A subsequent increase in humidity at outlet 66 may be used to trigger controller 40 to return to normal valve control.

Once controller 40 has initiated sleep mode, a change in the various triggering conditions identified above may be used by controller 40 to terminate sleep mode and to return to normal valve operation. For example, the turning on of air compressor 12, the detection of air flow through air dryer 16, an increase in MR1 pressure above a predetermined threshold, power at the auxiliary generator, a recharge of the locomotive battery above a predetermined number of volts, and/or a change in the humidity at the air dryer outlet 66 may trigger a return to normal operations. Alternatively, or in addition thereto, controller 40 may be programmed to return to normal valve operations periodically, such as once every twenty-four hours, and then reenter valve control sleep mode if the conditions of air supply system 10 for initiating sleep mode are still present.

Figure 4:
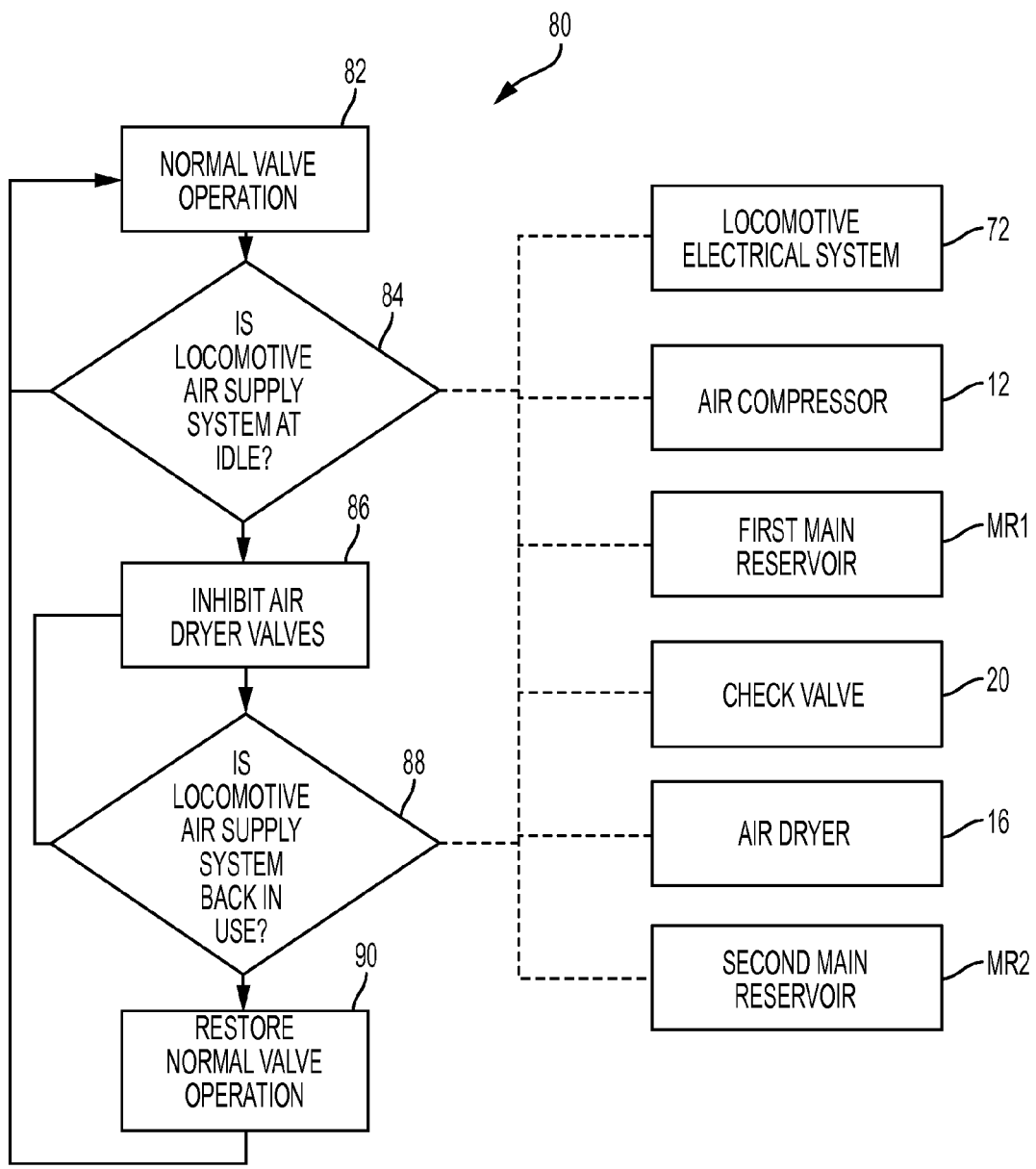
FIG. 4 is a flowchart of a sleep mode implementation process for an air dryer according to the present invention.

Referring to FIG. 4, controller 40 may thus implement a sleep mode process 80 that begins with air dryer 16 in normal valve operation 82. Controller 40 then performs a check 82 to determine whether locomotive air supply system 10 is intended to be at idle using one or more of the approaches discussed above. For example, controller 40 can check locomotive electrical system 72, air compressor 12, first main reservoir MR1, check valve 20, air dryer 16, or second main reservoir MR2 for relevant status data and then perform any necessary calculations as described above to determine if system 10 is idle such that air dryer 16 should be placed into sleep mode and all valves de-energized. If a check 84 indicates that the locomotive air supply system is not in use, such as by being idle for a predetermined period of time, controller 40 inhibits air dryer valves 86, thus putting air dryer 16 into sleep mode. Controller 40, according to a predetermined schedule, performs a subsequent check 88 of the relevant aspects of system 10 to determine whether locomotive air supply system 10 is back in use. If so, controller 40 restores normal valve operation 90.

What is claimed is:

1. An air dryer for a locomotive air supply system, comprising:
   a set of valves including a drain valve and an exhaust valve for controlling the flow of air from an inlet through at least one desiccant tower to an outlet; and
   a controller for piloting the set of valves that is programmed to inhibit operation of the valves such that the drain valve and the exhaust valve are closed in response to a determination that the locomotive air supply system is not in use and will remain closed until the controller determines that the air supply system is in use.

2. The air dryer of claim 1, wherein the controller is programmed to determine that the locomotive air supply system is not in use by detecting that an air compressor supplying air to the air dryer has not been in operation for a predetermined period of time.

3. The air dryer of claim 1, wherein the controller is programmed to determine that the locomotive air supply system is not in use based on the electrical state of a diesel locomotive coupled to the air dryer.

4. The air dryer of claim 1, wherein the controller is programmed to determine that the locomotive air supply system is not in use by detecting a lack of air flow through the air dryer over a predetermined period of time.

5. The air dryer of claim 1, wherein the controller is programmed to determine that the locomotive air supply system is not in use based on the pressure in a first main reservoir.

6. The air dryer of claim 1, wherein the controller is programmed to determine that the locomotive air supply system is not in use based on the pressure in a second main reservoir of a locomotive.

7. The air dryer of claim 1, wherein the controller is programmed to determine that the locomotive air supply system is not in use based on the humidity of any air in the air dryer.

8. The air dryer of claim 1, wherein the controller is programmed to activate the series of valves a predetermined period of time after inhibiting the series of valves.

9. A locomotive air supply system, comprising
   an air compressor driven by an electrical power source that is charged by the locomotive;
   a first main reservoir for storing compressed air received from the air compressor;
   an air dryer coupled to the first main reservoir via a check valve and having a series of valves including a drain valve and an exhaust valve for controlling the flow of air through at least one desiccant tower and a controller for piloting the series of valves, wherein the controller of the air dryer is programmed to inhibit operation of the series of valves such that the drain valve and the exhaust valve are closed in response to a determination that the locomotive air supply system is not in use and will remain closed until the controller determines that the air supply system is in use; and
   a second main reservoir coupled to the air dryer for receiving and storing dried compressed air from the air dryer.

10. The system of claim 9, wherein the controller is coupled to at least one of the air compressor and the power source.

11. The system of claim 9, wherein the controller is coupled to check valve.

12. The system of claim 9, wherein the controller is coupled to a pressure sensor in at least one of the first main reservoir and the second main reservoir.

13. The system of claim 9, wherein the air dryer further comprises a humidity sensor coupled to the controller.

14. A method of controlling an air dryer having a series of valves used in a locomotive air supply system, comprising the steps of:
   providing an air dryer having a set of valves including a drain valve and an exhaust valve for controlling the flow of air from an inlet through at least one desiccant tower to an outlet and a controller for piloting the set of valves;
   determining whether the locomotive air supply system is not in use; and
   using the controller to inhibit the series of valves such that the drain valve and the exhaust valve are closed while the locomotive air supply system is not in use and will remain closed until the controller determines that the air supply system is in use.

15. The method of claim 14, wherein the step of determining whether the locomotive air supply system is not in use comprises detecting at least one of the air compressor not supplying air, a non-charging electrical state of the locomotive, a lack of air flow through the air dryer over a predetermined period of time; a lack of sufficient pressure in a first main reservoir, a sufficient amount of pressure in the second main reservoir relative to the first main reservoir, a sufficient level humidity in the air exiting the air dryer over a predetermined period of time.

\* \* \* \* \*